United States Patent [19]

Yamane et al.

[11] 4,405,174
[45] Sep. 20, 1983

[54] WINDOW STRUCTURE OF A VEHICLE BODY

[75] Inventors: Yukio Yamane, Yokosuka; Kazuhiko Yoshiyuki, Yokohama; Toshiaki Endo, Chigasaki, all of Japan

[73] Assignee: Nissan Motor Company, Limited, Yokohama, Japan

[21] Appl. No.: 259,584

[22] Filed: May 1, 1981

[30] Foreign Application Priority Data

May 7, 1980 [JP] Japan ................................ 55-59406

[51] Int. Cl.³ ............................................ B62D 27/00
[52] U.S. Cl. ..................................... 296/201; 52/208; 296/93
[58] Field of Search .................... 296/93, 84 R, 84 A, 296/84 D, 90, 200, 201, 29, 192, 194; 52/718, 208, 716, 397, 400, 717, 204

[56] References Cited

U.S. PATENT DOCUMENTS

| 2,248,297 | 7/1941 | Chaffee | 52/400 |
| 4,165,119 | 8/1979 | Hedeen et al. | 296/93 |
| 4,179,859 | 12/1979 | Fricko et al. | 52/397 |

*Primary Examiner*—Robert R. Song
*Assistant Examiner*—Dennis Pedder
*Attorney, Agent, or Firm*—Lane, Aitken & Kananen

[57] ABSTRACT

A window structure of a vehicle body, comprises an inwardly offset flange structure defining a window opening therein, the inwardly offset flange structure including inwardly bent walls which have substantially straight wall portions and curved corner wall portions each merging into adjacent two of the straight wall portions; a window panel secured to the flange structure for closing the window opening, the window panel having an edge wall which includes a plurality of substantially straight edge wall portions respectively spaced apart from the straight wall portions and a plurality of curved corner edge wall portions each merging into adjacent two of the straight edge wall portions and respectively spaced apart from the curved corner wall portions, each of the straight edge wall portions and each of the straight wall portions forming a straight gap therebetween, and each of the curved corner edge wall portions and each of the curved corner wall portions forming therebetween a curved corner gap which merges into the adjacent two of the straight gaps and which is at least partially smaller in width than each of the straight gaps; and a resilient reveal molding fitted in and lengthwise extending along the straight gaps and the curved corner gaps for concealing the straight gaps and the curved corner gaps behind the molding.

1 Claim, 7 Drawing Figures

WINDOW STRUCTURE OF A VEHICLE BODY

FIELD OF THE INVENTION

The present invention relates to a window structure of a vehicle body of, particularly, the nature including a flange structure defining a window opening therein, a window panel secured to the flange structure for closing the window opening and forming straight gaps and curved corner gaps between the flange structure and the window panel, and a resilient reveal molding fitted in the straight gaps and curved corner gaps for concealing the gaps behind the molding.

SUMMARY OF THE INVENTION

In accordance with the present invention, there is provided a window structure of a vehicle body which comprises an inwardly offset flange structure defining a window opening therein, the inwardly offset flange structure including inwardly bent walls which have substantially straight wall portions and curved corner wall portions each merging into adjacent two of the straight wall portions; a window panel secured to the flange structure for closing the window opening, the window panel having an edge wall which includes a plurality of substantially straight edge wall portions respectively spaced apart from the straight wall portions and a plurality of curved corner edge wall portions each merging into adjacent two of the straight edge wall portions and respectively spaced apart from the curved corner wall portions, each of the straight edge wall portions and each of the straight wall portions forming a straight gap therebetween, and each of the curved corner edge wall portions and each of the curved corner wall portions forming therebetween a curved corner gap which merges into the adjacent two of the straight gaps and which is at least partially smaller in width than each of the straight gaps; and a resilient reveal molding fitted in and lengthwise extending along the straight gaps and the curved corner gaps for concealing the straight gaps and the curved corner gaps behind the molding.

BRIEF DESCRIPTION OF THE DRAWINGS

Drawbacks of a prior-art window structure of a vehicle body and further features of a window structure of a vehicle body proposed by the present invention will be understood from the following description taken in conjunction with the accompanying drawings, in which like reference numerals designate corresponding or similar members and elements and in which.

DESCRIPTION OF THE PRIOR ART

Figure 1:
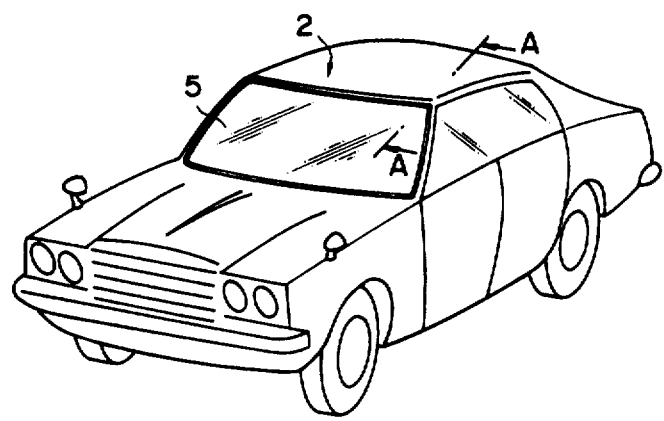
FIG. 1 is a perspective view showing an automotive vehicle with a window structure to which the present invention is applicable.
Figure 2:
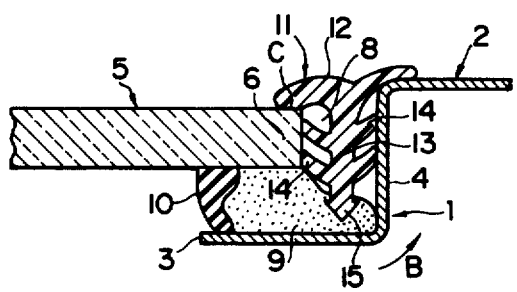
FIG. 2 is an enlarged fragmentary cross sectional view taken on the line A—A in FIG. 1 but shows a portion of a prior-art window structure of a vehicle body.
Figure 3:
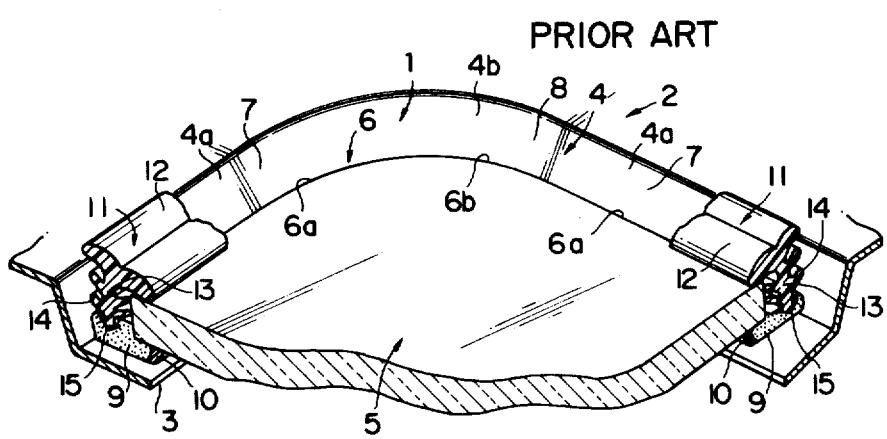
FIG. 3 is an enlarged fragmentary perspective view of a portion of the prior-art window structure.

Such a window structure is employed in a vehicle such as, for example, an automotive vehicle as shown in FIG. 1. There have thus far been proposed various types of window structures of vehicle bodies, one of which is shown in FIGS. 2 and 3. In FIGS. 2 and 3, a front window structure is illustrated as a typical example of such a window structure and comprises an inwardly offset flange structure 1 forming part of a vehicle body 2 and defining a generally trapezoidal window opening 3 therein. The flange structure 1 includes inwardly bent walls 4 such as a portion of the vehicle body 2, a cowl, pillars and the like which have substantially straight wall portions 4a and curved corner wall portions 4b merging into adjacent two of the straight wall portions 4a. A generally trapezoidal front window panel 5 of, for example, glass is secured to the flange structure 1 for closing the front window opening 3. The front window panel 5 has an edge wall 6 which includes a plurality of substantially straight edge wall portions 6a respectively spaced apart from the straight wall portions 4a of the inwardly bent walls 4 and a plurality of curved corner edge wall portions 6b each merging into adjacent two of the straight edge wall portions 6a and respectively spaced apart from the curved corner wall portions 4b of the inwardly bent walls 4 so that each of the straight edge wall portions 6a and each of the straight wall portions 4a form a straight gap 7 therebetween and each of the curved corner edge wall portions 6b and each of the curved corner wall portions 4b form therebetween a curved corner gap 8 which merges into the adjacent two of the straight gaps 7. Between the flange structure 1 and the front window panel 5 is interposed an adhesive compound 9 by means of which the front window panel 5 is bonded to the flange structure 1. A dam rubber 10 is also interposed between the window panel 5 and the flange structure 1 adjacent the front window opening 3 so as to hold the adhesive compound 9 in position between the flange structure 1 and the window panel 5. An elongate resilient reveal molding 11 of, for example, synthetic resin is generally T-shaped in cross section and is fitted in and lengthwise extends along the straight and curved corner gaps 7 and 8 for concealing the straight and curved corner gaps 7 and 8 behind the reveal molding 11. The reveal molding 11 comprises a decorative trim portion 12 bridging the vehicle body 2 and the front window panel 5, a stem portion 13 integral with the decorative trim portion 12 and extending in the straight and curved corner gaps 7 and 8, a plurality of retrorse fins 14 extending outwardly from both sides of the stem portion 13 and angled toward the decorative trim portion 12 for engagement with the bent walls 4 of the vehicle body 2 and the edge wall 6 of the front window panel 5. The stem portion 13 is formed at its inner end with a bead 15 which is arrow-shaped in cross section and which is embedded in the adhesive compound 9 for preventing the reveal molding 11 from being dislodged out of the straight and curved corner gaps 7 and 8.

With such a construction as shown in FIGS. 2 and 3, the straight and curved corner gaps 7 and 8 are substantially identical in width lengthwise along the bent walls 4 and the edge wall 6 so as to have the elongate reveal molding 11 fitted therein. This results in the fact that the elongate reveal molding 11 is required to be deformed conformingly to the radii of curvature of the curved corner gaps 8 when the reveal molding 11 is fitted in the curved corner gaps 8. In the event that the outer surface of the front window panel 5 is held inwardly from the outer surface of the vehicle body 2, the stem portion 13 tends to be subjected to such an internal resiliency as shown in an arrow indicated at B in FIG. 2 by the deformation of the reveal molding 11 when the reveal molding 11 is fitted in the curved corner gaps 8. More specifically, the stem portion 13 is forced to be rotatingly moved around a contacting line C on which the decorative trim portion 12 is in contact with the outer surface of the front window panel 5, and is thus dislodged out of the curved corner gaps 8 and shrinks toward the centers of radii of curvature of the curved corner edge wall portions 6b. As a consequence, the decorative trim portion 12 of the reveal molding 11 is raised outwardly from the outer surface of the vehicle body 2, which makes it impossible to conceal the curved corner gaps 8. When this occurs, the resilient reveal molding 11 impairs the external appearance of the window structure as a whole. Moreover, foreign matter or substances such as dust, water and the like are inevitably introduced into the gaps so that the internal vehicle body will be rusted and corroded. The present invention contemplates provision of an improved window structure which has the reveal molding firmly retained in the curved corner gaps between the bent walls of the vehicle body and the edge wall of the window panel for preventing the reveal molding from being outwardly dislodged out of the curved corner gaps.

DESCRIPTION OF THE PREFERRED EMBODIMENTS

Figure 4:
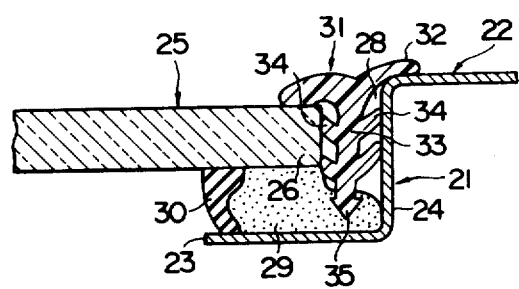
FIG. 4 is an enlarged fragmentary cross sectional view similar to FIG. 2 but shows a first preferred embodiment of a window structure of a vehicle body according to the present invention.
Figure 5:
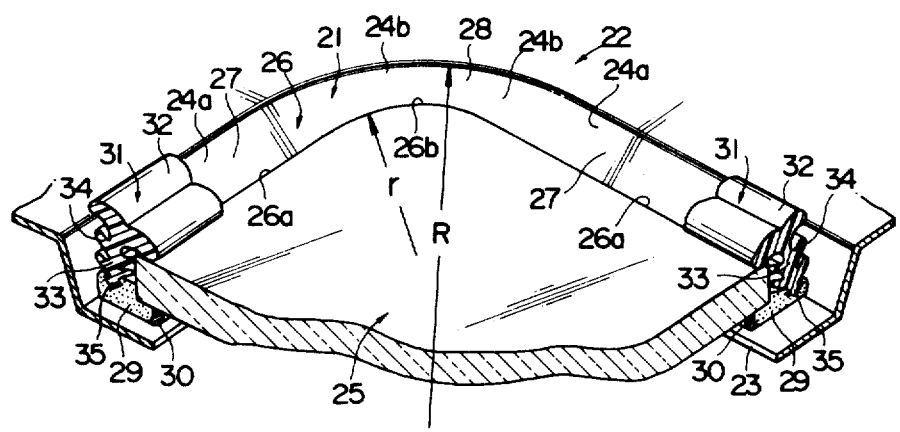
FIG. 5 is an enlarged fragmentary perspective view similar to FIG. 3 but shows the first preferred embodiment of the window structure of the vehicle body according to the present invention.

Referring now to FIGS. 4 and 5 of the drawings, a first embodiment of a window structure according to the present invention is shown comprising an inwardly offset flange structure 21 forming part of a vehicle body 22 and defining a generally trapezoidal front window opening 23 therein. The flange structure 21 includes inwardly bent walls 24, such as a portion of the vehicle body 22, a cowl, pillars and the like which have substantially straight wall portions 24a and curved corner wall portions 24b merging into adjacent two of the straight wall portions 24a. A generally trapezoidal front window panel 25 of, for example, glass is secured to the flange structure 21 for closing the front window opening 23. The front window panel 25 has an edge wall 26 which includes a plurality of substantially straight edge wall portions 26a respectively spaced apart from the straight wall portions 24a of the inwardly bent walls 24 and a plurality of curved corner edge wall portions 26b each merging into adjacent two of the straight edge wall portions 26a and respectively spaced apart from the curved corner wall portions 24b of the inwardly bent walls 24 so that each of the straight edge wall portions 26a and each of the straight wall portions 24a form a straight gap 27 therebetween and each of the curved corner edge wall portions 26b and each of the curved corner wall portions 24b form therebetween a curved corner gap 28 which merges into the adjacent two of the straight gaps 27.

In the first embodiment, of the present invention, the curved corner wall portions 24b of the bent walls 24 and the curved edge wall portions 26b of the window panel 26 are so curved that the center of the radius R of curvature of each of the curved corner wall protions 24b is more remote than the center of the radius r of curvature of such of the curved edge wall portions 26b from each of the curved corner gaps 28 that the radius R of curvature of each of the curved corner wall portions 24b is larger than the radius r of curvature of each of the curved edge wall portions 26b. This means that each of the curved corner gaps 28 is smaller in width than each of the straight gaps 27. Between the outer peripheral surface of the flange structure 21 and the inner peripheral surface of the front window panel 25 is interposed an adhesive compound 29 by means of which the inner peripheral surface of the front window panel 25 is bonded to the outer peripheral flange structure 21. A dam rubber 30 is also interposed between the front window panel 25 and the flange structure 21 adjacent the front window opening 23 so as to hold the adhesive compound 9 in position between the flange structure 21 and the front window panel 25. An elongate resilient reveal molding 31 of, for example, synthetic resin is generally T-shaped in cross section and is fitted in and lengthwise extends along the straight and curved corner gaps 27 and 28 for concealing the straight and curved corner gaps 27 and 28 behind the reveal molding 31. The reveal molding 31 comprises a decorative trim portion 32 bridging the vehicle body 22 and the front window panel 25, a stem portion 33 integral with the decorative trim portion 32 and extending in the straight and curved corner gaps 27 and 28, and a plurality of retrorse fins 34 extending outwardly from both sides of the stem portion 33 and angled toward the decorative trim portion 32 for engagement with the bent walls 24 of the vehicle body 22 and the edge wall 26 of the front window panel 25. The stem portion 33 is formed at its inner end with a bead 35 which is arrow-shaped in cross section and which is embedded in the adhesive compound 29 for preventing the reveal molding 31 from being dislodged out of the straight and curved corner gaps 27 and 28. The reveal molding 31 is assembled to the vehicle body 22 by being thrust into the straight and curved corner gaps 27 and 28 between the bent walls 24 of the flange structure 21 and the edge wall 26 of the window panel 25 prior to curing of the adhesive compound 29. Upon entry, the retorse fins 34 are caused to yield to the extent necessary to fit between the edge wall 26 and the bent walls 24 and the bead 35 is anchored in the adhesive compound 29. Upon curing of the adhesive compound 29, the bead 35 of the reveal molding 31 becomes mechanically embedded in the adhesive compound 29 to retain the reveal molding 31 against removal.

With such a construction as shown in FIGS. 4 and 5, the curved corner gaps 28 are smaller in width than the straight gaps 27 so that the retrorse fins 34 are more compressed in the curved corner gaps 28 than in the straight corner gaps 27 and the stem portion 33 is firmly retained at the centers of the curved corner gaps 28. As a consequence, the stem portion 33 is prevented from being outwardly dislodged out of the curved corner gaps 28 even if the stem portion 33 is subjected to the deformation of the reveal molding 31 when the outer surface of the front window panel 25 is held inwardly from the outer surface of the vehicle body 22.

Figure 6:
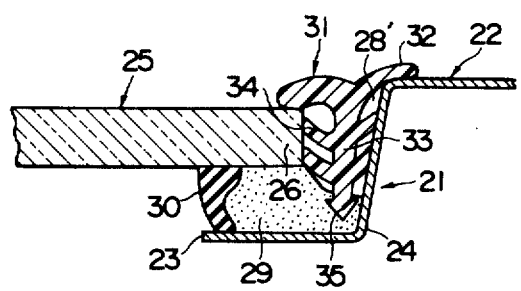
FIG. 6 is an enlarged fragmentary cross sectional view similar to FIG. 5 but shows a second preferred embodiment of the window structure of the vehicle body according to the present invention.
Figure 7:
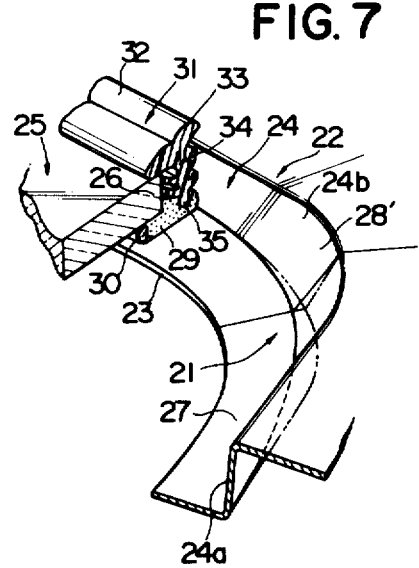
FIG. 7 is an enlarged fragmentary perspective view similar to FIG. 5 but shows the second preferred embodiment of the window structure of the vehicle body according to the present invention.

With reference to FIGS. 6 and 7, there is shown a second embodiment of the present invention in which each of the curved corner gaps 28' has an outer end flush with the outer surface of the front window panel 25 and an inner end extending on the same plane as the inner surface of the front window panel 25. Each of the curved corner wall portions 24b of the bent walls 24 has an outer face inclined with respect to, and away from, the end face of each of the curved corner edge wall portions 26b of the window panel 25 in such a manner that each of the curved corner gaps 28' is smaller in width at the inner end than at the outer end thereof. The remaining members or elements forming part of the window structure are substantially identical to those of the window structure as shown in FIGS. 4 and 5. Therefore, the remaining members or elements of the window structure as shown in FIGS. 6 and 7 are not described for simplicity but indicated by the same reference numerals as those of the window structure in FIGS. 4 and 5. For reasons similar to those discussed in connection with the first embodiment in FIGS. 4 and 5, the retrorse fins 34 are more compressed in the curved corner gaps 28' than in the straight gaps 27 and the stem portion 33 is firmly retained at the centers of the curved corner gaps 28'. The stem portion 33 is prevented from being outwardly dislodged out of the curved corner gaps 28' even if the stem portion 33 is subjected to the internal resiliency of the reveal molding 31.

While there has been described in the afore-mentioned embodiments a front window structure as a typical example of a window structure according to the present invention, any other window structure such as rear and unopenable opera window structures may, of course, be applied to the embodiments according to the present invention. In addition, the window structure may be applied to boats, ships, aircraft, and other vehicles.

Although particular first and second embodiments of the present invention have been shown and described, it will be obvious to those skilled in the art that various changes and modifications may be made without departing from the spirit and scope of the present invention.

What is claimed is:

1. A window structure of a vehicle body, comprising:
an inwardly offset flange structure defining a window opening therein, the inwardly offset flange structure including inwardly bent walls which have substantially straight wall portions and curved corner wall portions each merging into adjacent two of the straight wall portions;

a window panel secured to said flange structure for closing said window opening, the window panel having an edge wall which includes a plurality of substantially straight edge wall portions respectively spaced apart from said straight wall portions and a plurality of curved corner edge wall portions each merging into adjacent two of the straight edge wall portions and respectively spaced apart from said curved corner wall portions, each of said straight edge wall portions and each of said straight wall portions forming a straight gap therebetween, and each of said curved corner edge wall portions and each of said curved corner wall portions forming therebetween a curved corner gap which merges into the adjacent two of the straight gaps and which is at least partially smaller in width than each of said straight gaps;

an adhesive compound interposed between the outer peripheral surface of said flange structure and the inner peripheral surface of said window panel for bonding the outer peripheral surface of said flange structure and the inner peripheral surface of said window panel; and a reveal molding comprising a decorative trim portion bridging said vehicle body and said window panel, a stem portion integral with said decorative trim portion and extending in said straight and curved corner gaps, said stem portion having at its inner end an arrow-shaped bead embedded in said adhesive compound for preventing said stem portion from being dislodged out of said straight and curved corner gaps, and a plurality of retrorse fins extending outwardly from both sides of said stem portion and angled toward said decorative trim portion for engagement with said bent walls of said vehicle body and said edge wall of said window panel;

in which each of said curved corner gaps has an outer end extending on the same plane as the outer surface of said window panel and an inner end extending on the same plane as the inner surface of said window panel, each of said curved corner wall portions having an outer face inclined with respect to and away from the end face of each of said curved corner edge wall portions in such a manner that each of said curved corner gaps is smaller in width at the inner end than at the outer end thereof.

* * * * *